(12) United States Patent
Thyagarajan et al.

(10) Patent No.: US 10,727,923 B2
(45) Date of Patent: Jul. 28, 2020

(54) MULTI-ANTENNA BEAM FORMING AND SPATIAL MULTIPLEXING TRANSCEIVER

(71) Applicant: RF Pixels, Inc., Fremont, CA (US)

(72) Inventors: Siva V. Thyagarajan, San Jose, CA (US); Ali Niknejad, Berkeley, CA (US); Sriramkumar Venugopalan, Campbell, CA (US)

(73) Assignee: Rf Pixels, Inc., Fremont, CA (US)

( * ) Notice: Subject to any disclaimer, the term of this patent is extended or adjusted under 35 U.S.C. 154(b) by 0 days.

(21) Appl. No.: 15/791,294

(22) Filed: Oct. 23, 2017

(65) Prior Publication Data

US 2018/0115360 A1 Apr. 26, 2018

Related U.S. Application Data

(60) Provisional application No. 62/412,211, filed on Oct. 24, 2016.

(51) Int. Cl.
*H04B 7/06* (2006.01)
*H04B 17/12* (2015.01)
*H01Q 3/26* (2006.01)
*H01Q 3/38* (2006.01)
*H04B 7/0452* (2017.01)

(52) U.S. Cl.
CPC ........... *H04B 7/0691* (2013.01); *H01Q 3/267* (2013.01); *H01Q 3/38* (2013.01); *H04B 7/0452* (2013.01); *H04B 7/0617* (2013.01); *H04B 7/0697* (2013.01); *H04B 17/12* (2015.01)

(58) Field of Classification Search
None
See application file for complete search history.

(56) References Cited

U.S. PATENT DOCUMENTS 8,428,529 B2 * 4/2013 Dakshinamurthy ........................ H01Q 3/2647
455/139
9,755,306 B1 * 9/2017 Ogilvie .................... H01Q 3/28
10,439,851 B2 * 10/2019 Novak ..................... H04L 27/14
(Continued)

OTHER PUBLICATIONS

International Search Report dated Jan. 5, 2018, for PCT Application No. PCT/US2017/058137, filed on Oct. 24, 2017, 2 pages.
(Continued)

*Primary Examiner* — Alex Skripnikov
*Assistant Examiner* — Richard Schnell
(74) *Attorney, Agent, or Firm* — Cooley LLP

(57) ABSTRACT

An apparatus has an array of antennae. Each antenna in the array has a tile circuit including a frequency conversion circuit to generate from an incoming reference signal a local oscillator carrier signal operative as an outgoing reference signal for an adjacent tile circuit. A mixer receives the local oscillator carrier signal and combines it with an antenna signal to produce a frequency converted antenna signal. A matrix of phase shifters and variable gain elements produces a set of frequency converted and phase rotated antenna signals. Analog summers combine the frequency converted and phase rotated antenna signals with user input signals from the adjacent tile circuit for distributed analog beam forming of multiple streams. The user input signals correspond to distinct users tracked by the array of antennae.

21 Claims, 13 Drawing Sheets

(56) References Cited

U.S. PATENT DOCUMENTS

| | | |
|---|---|---|
| 2003/0160720 A1 | 8/2003 | Maceo et al. |
| 2005/0110681 A1 | 5/2005 | Londre |
| 2006/0152416 A1 | 7/2006 | Mohamadi |
| 2006/0173305 A1* | 8/2006 | Asafusa .............. G01S 7/52023 600/437 |
| 2007/0155344 A1 | 7/2007 | Wiessner et al. |
| 2007/0210959 A1 | 9/2007 | Herd et al. |
| 2011/0109507 A1 | 5/2011 | Warnick |
| 2011/0122016 A1 | 5/2011 | Lomes et al. |
| 2014/0097986 A1 | 4/2014 | Xue et al. |
| 2014/0169509 A1 | 6/2014 | Tsofe |
| 2016/0233931 A1* | 8/2016 | van Zelst ............... H04B 17/12 |

OTHER PUBLICATIONS

Written Opinion of the International Searching Authority dated Jan. 5, 2018, for PCT Application No. PCT/US2017/058137, filed on Oct. 24, 2017, 6 pages.

* cited by examiner

MULTI-ANTENNA BEAM FORMING AND SPATIAL MULTIPLEXING TRANSCEIVER

CROSS-REFERENCE TO RELATED APPLICATION

This application claims priority to U.S. Provisional Patent Application Ser. No. 62/412,211, filed Oct. 24, 2016, the contents of which are incorporated herein by reference.

FIELD OF THE INVENTION

This application relates generally to wireless communications. More particularly, this invention is directed toward a multi-antenna beam forming and spatial multiplexing transceiver.

BACKGROUND OF THE INVENTION

Technology for beam forming is well known art and can be realized through an array of antennas and phase shifters whereby the phase of each antenna signal is shifted to compensate for the different time of arrival of the signal coming from an arbitrary angle relative to its neighboring antenna element. If radio frequency (RF) phase shifters are used, then the signal of all the antenna elements must be combined to form a single RF signal that is spatially filtered. Such a scheme is not easily tiled or efficient because the array as described can only look in one direction at a time, which precludes true spatial multiplexing. Furthermore, processing RF signals is difficult due to the large insertion loss of most phase shifters, the limited resolution of such phase shifters, and the difficulty of summing RF signals directly in an impedance controlled environment. The element that does the signal summation will be very large in area due to the physically large area of RF summation blocks, such as transmission line based Wilkinson combiners, and it will need a large gain to overcome the lossy signal distribution at RF.

While in theory the number of simultaneous "look" directions of the array can be increased by duplicating the number of phase shifters in each tile, or by using Butler matrices, this approach does not scale well for all of the aforementioned reasons. The RF signal needs to be split into Ns copies, incurring loss, and then each signal path is phase shifted and combined, incurring more loss. A better approach is to use IF or baseband phase rotators, which are usually implemented by taking a weighted combination of in-phase (I) and quadrature-phase (Q) signals. Such a vector combiner is compact, can be realized with all active circuitry, and can provide accurate phase control. In previously described art, building a large array requires performing analog summation of a very large number of output signals (equal to the number of antennas), which is limited by the parasitic capacitance in the output summer structure. Processing multiple streams makes this signal processing and routing even more challenging. In practice, the output of only a limited number of elements could be efficiently processed in the analog domain, limiting the array size to a dozen elements, particularly at microwave and mm-wave frequencies.

Full digital beam forming is very flexible and easily tiled, since each tile element consists of a full radio and digital outputs, but suffers from a very large number of signals that must be digitized (equal to the number of antenna elements) and the vast amount of data that must be transported for centralized signal processing. Recently, researchers at the Berkeley Wireless Research Center (BWRC) have proposed a distributed digital array architecture that eliminates the central processing by performing the beam forming in a distributed fashion. In such an architecture, the number of analog-to-digital convertors (ADCs) is not reduced, but the data transported across the array is cut down significantly.

The challenge is to find an architecture that is amenable to tiling and can also perform beam forming in the analog domain, so that the number of signals to be processed is reduced from the antenna count down to the number of streams (or spatial directions) that are to be processed.

SUMMARY OF THE INVENTION

An apparatus has an array of antennae. Each antenna in the array has a tile circuit including a frequency conversion circuit to generate from an incoming reference signal a local oscillator carrier signal operative as an outgoing reference signal for an adjacent tile circuit. A mixer receives the local oscillator carrier signal and combines it with an antenna signal to produce a frequency converted antenna signal. A matrix of phase shifters and variable gain elements produces a set of frequency converted and phase rotated antenna signals. Analog summers combine the frequency converted and phase rotated antenna signals with user input signals from the adjacent tile circuit for distributed analog beam forming of multiple streams. The user input signals correspond to distinct users tracked by the array of antennae.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

A tile is formed by one or more pixel elements. Each pixel element has a single radio transceiver and an array of phase rotators/variable gain elements that allow one to construct an arbitrarily sized antenna array by tiling identical elements for beam forming, multi-user spatial multiplexing, or the efficient realization of a massive Multi Input Multi Output (MIMO) system. The unique aspect of the technology is that any number of antennas or number of beams/users can be supported with the same tile element by simply cascading the tiles into an arbitrary shape, linked by a vector of analog baseband or intermediate frequency (IF) data streams that feed from one tile to the next, and are programmed through a digital interface.

Figure 1:
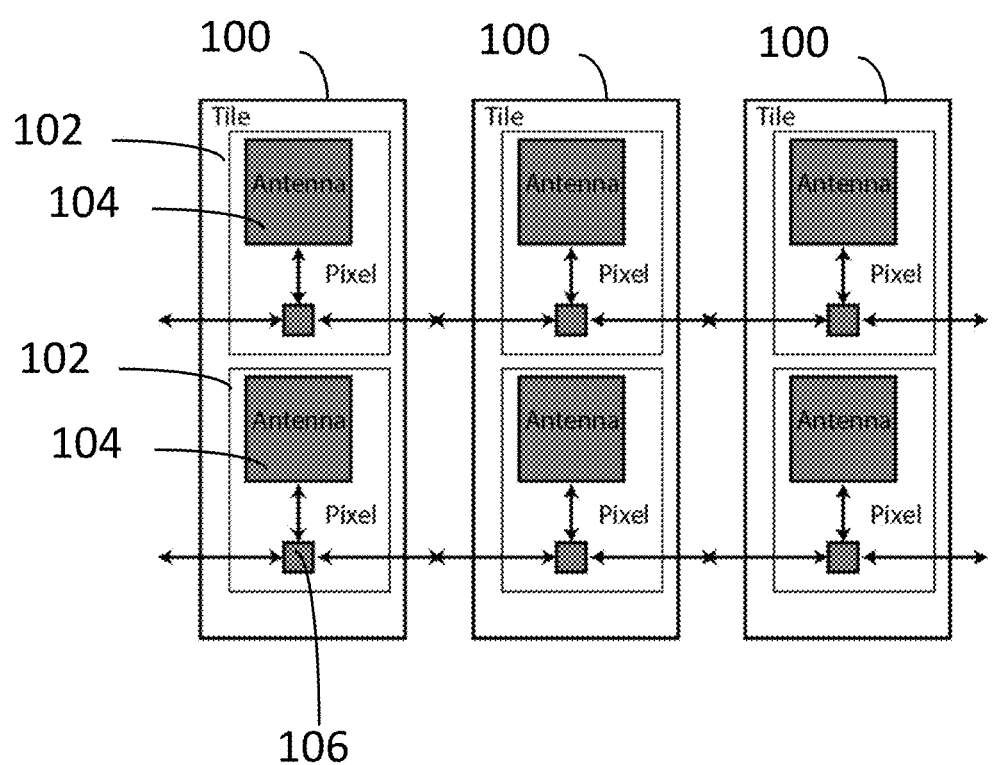
FIG. 1 illustrates individual tiles made of one or more pixel elements; strings of tiles are formed with nearest neighbor connections in accordance with an embodiment of the invention.

FIG. 1 illustrates tiles 100. Each tile 100 has pixel elements 102. Each pixel element 102 has an antenna 104. Each pixel 100 also has a signal interface 106 for input and output signals that correspond to distinct data streams formed by simultaneously steering of the array in distinct directions or beams for traditional beam-forming, multi-user spatial multiplexing, and massive MIMO applications.

In the receive path, each tile element does local beam forming on each data stream by combining the incoming signal with the tile's own down-converted signal using baseband or IF phase rotators and variable gain amplifiers. In one embodiment, each tile does analog summation of a phase rotated down-converted signal with the incoming signal from its "left" neighbor, and passes this signal to its output at the "right". The output signal is buffered with programmable gain to allow an arbitrary number of tiles to be used without incurring signal loss. In this fashion, as the signal propagates from tile to tile, each stream will gain signals in a desired direction while attenuating components in unwanted directions, thereby performing spatial filtering on the RF signal in the case of the receiver (Rx), and focusing the transmitted streams in desired directions for the transmitter (Tx).

Several parallel streams are handled by each tile, corresponding to the number of users or beams tracked by the array. For such a tile, the number of streams is fixed at $N_s$, but the number of antennas can be arbitrary, since the tile grows without bound. All tile elements are identical in construction but are individualized through a digital interface. The head tile, for example, should have its inputs to the "left" (incoming vector) terminated so that no input is summed with the antenna processed signal. The last element of the tile should feed its vector of output signals to another module, such as an analog and/or digital signal processor. The processor performs digitization for massive MIMO signal processing, such as zero-forcing processing to null out unwanted interference from each stream.

Figure 2B:
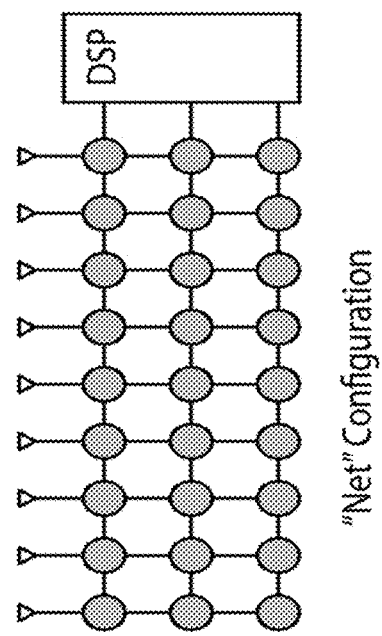
FIG. 2B illustrates a net configuration in which one row is connected to the antenna and new tile elements are interconnected to perform additional beamforming on new streams.
Figure 2A:
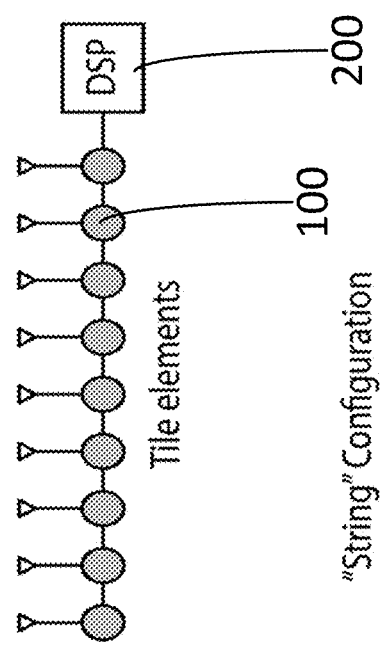
FIG. 2A illustrates tile elements in a string configuration to form a linked array with an analog interconnection from element-to-element.

FIG. 2A illustrates a string of tiles 100 terminating with a digital signal processor 200. Such a string can form any arbitrary shape (surface or volume), such as a linear array, a two dimensional array, formed as a zig-zag of array elements, or even a three dimensional curve or surface. Thus the tile can grow in a conformal fashion for each application.

While the number of streams if fixed to $N_s$ for a single pixel per tile, if the number of pixels is increased and put into a "net" form, such as shown in FIG. 2B, the number of streams can be increased as well. To do this, the tile has an Rx baseband or IF output that is the raw down-converted in-phase and quadrature-phase antenna signal. Additional pixels are fed with the raw signal instead of the antenna signal, thereby increasing the number of data streams. This can be done in an arbitrary fashion as the output signals from each pixel are buffered. In the transmit path, the beam former summation block can take an additional input which allows a composite signal from another beam former tile to be summed with the current tile, increasing the number of streams processed.

The tile elements are synchronized with a reference signal generated at the tail, which travels from tail to head in the opposite direction as the tile data streams. In this way, the systematic delay between tile elements is compensated automatically by effectively delaying the LO signal to each tile element. Each tile feeds the next tile with the reference signal which can be programmed with an arbitrary delay, in case the tile element spacing does not correspond with the antenna element spacing, so that the systematic phase error is calibrated and compensated.

An embodiment of the invention is a scheme for tile calibration to compensate for systematic mismatches in tile elements (gain errors, phase errors, phase offset errors, etc.), whereby after the construction of the tile, a uniform array of horn antennas or near-field coupled signals directly feeds each tile element with a given known signal. Using the high speed digital interface, tile elements are programmed to maximize the signal-to-noise ratio (SNR) of the overall signal, which happens when each element tunes its gain and phase coefficients to point at the specified direction. Since the synthesized angle is known, it can be subtracted from the tile element phase terms to reveal a residual error term that is stored and used for subsequent measurements. In this way, the tile is quickly and accurately calibrated post assembly.

The disclosed architecture facilitates a very efficient realization of a massive MIMO or multi-user beam forming system as the same basic small pixels and tiles can be reused to build large arrays. Each pixel is small and constructed with minimum integrated circuit area, thus allowing low cost and high yields.

The technology described here applies to RF systems below 10 GHz, microwave systems below 30 GHz, and mm-wave and beyond systems above 30 GHz. Since the tile interconnectivity is with baseband or IF signals, there is no inherent frequency limit. Since only two tiles are connected at a time, there is no limit in bandwidth that can be realized for signal processing, which is a great advantage of the proposed architecture.

As shown in FIG. 1, a tile 100 is made of one or more pixels 102. For manufacturing reasons, it may be more economical to build many pixels into a single integrated circuit die, or to just build a single integrated circuit element containing a single pixel. The key aspect is that each tile is packaged with one or more antennas to build a unit element that can be easily tiled with other unit elements. Tiling can happen on the printed circuit board (PCB) or by building a single module and then routing signals on a separate PCB, connected with cables or through capacitive coupling. The signal that connect tile elements form a chain or string of tiles, which are sometimes referred to as a string of beads. The string can take any arbitrary shape.

Attention is initially directed toward the receiver tile architecture, and then the transmitter tile architecture. It should be appreciated that both can co-exist in the same tile, even if they are described separately. In some applications, a receive only or transmit only array can be designed, for example when an array is designed to receive signals from a vast number of sensor nodes which are primarily transmitting data. A tile element is described as operating at a single RF frequency with some given bandwidth. The tile could be designed to process multiple frequency bands by incorporating parallel transceivers inside the tile, either interfacing with the same antenna or each with its own dedicated set of antennas.

Reference to RF signals includes modulated signals from essentially very low frequencies (such as audio signals) all the way to typical frequencies used for mobile communication (below 6 GHz), bands extending from 5 GHz to 30 GHz, usually referred to as microwave frequency bands, and also frequencies beyond 30 GHz, referred to as millimeter wave bands. It should be noted that we will describe our system in the context of a communication system, whereas the same architecture can be applied to directional microphones that send and receive sound from multiple directions, ultrasound systems used for imaging that focus energy and detectors to a specific point inside the body, and other systems that utilize an array of transceivers or transducers for communication, imaging, heating, power transmission, and other applications.

An array of $N_a$ antennas is designed to process $N_s$ distinct signals, which are usually signals arriving from (or destined for) unique spatial angles where users reside, or directions that correspond to the optimal directions for communication or imaging due to multi-path or other complex non-line-of-sight phenomena, such as scattering, diffraction and refraction due to objects in the path of the energy flow. For some applications, $N_s=1$, or a single stream is processed. A system can handle many streams for spectral efficiency; doing this efficiently requires many antenna elements to form narrow beams, so $N_a \gg N_s$ in such applications. These systems are known as massive MIMO arrays.

Figure 3:
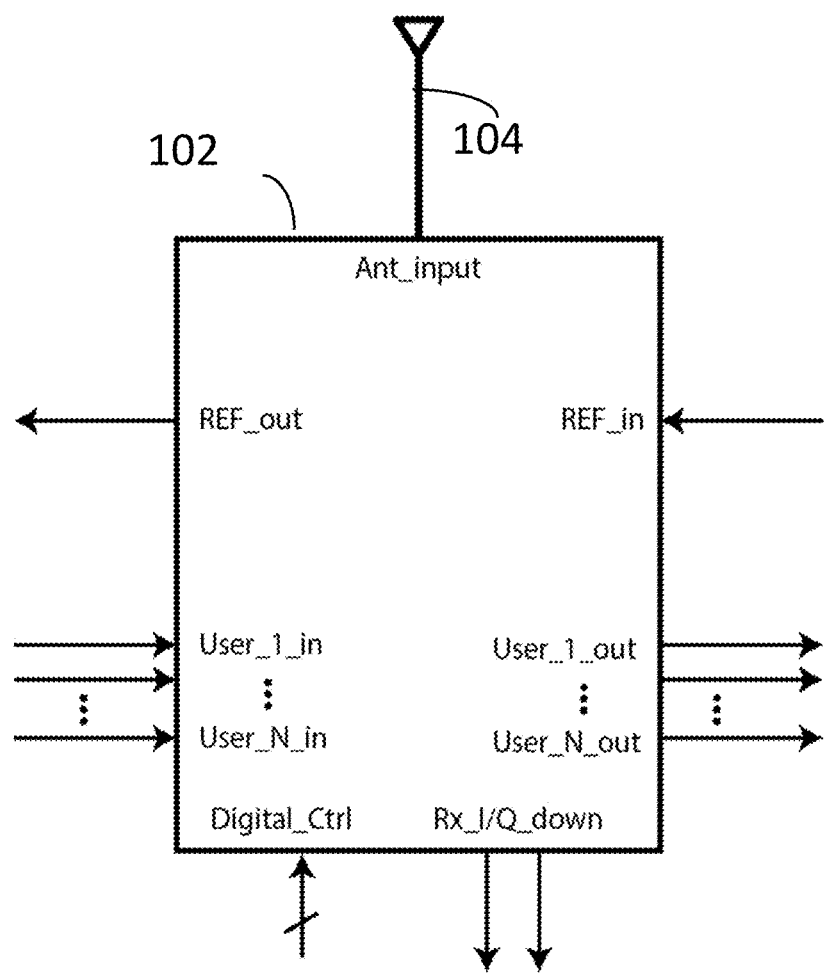
FIG. 3 illustrates a signal interface for a tile configured in accordance with an embodiment of the invention.
Figure 4:
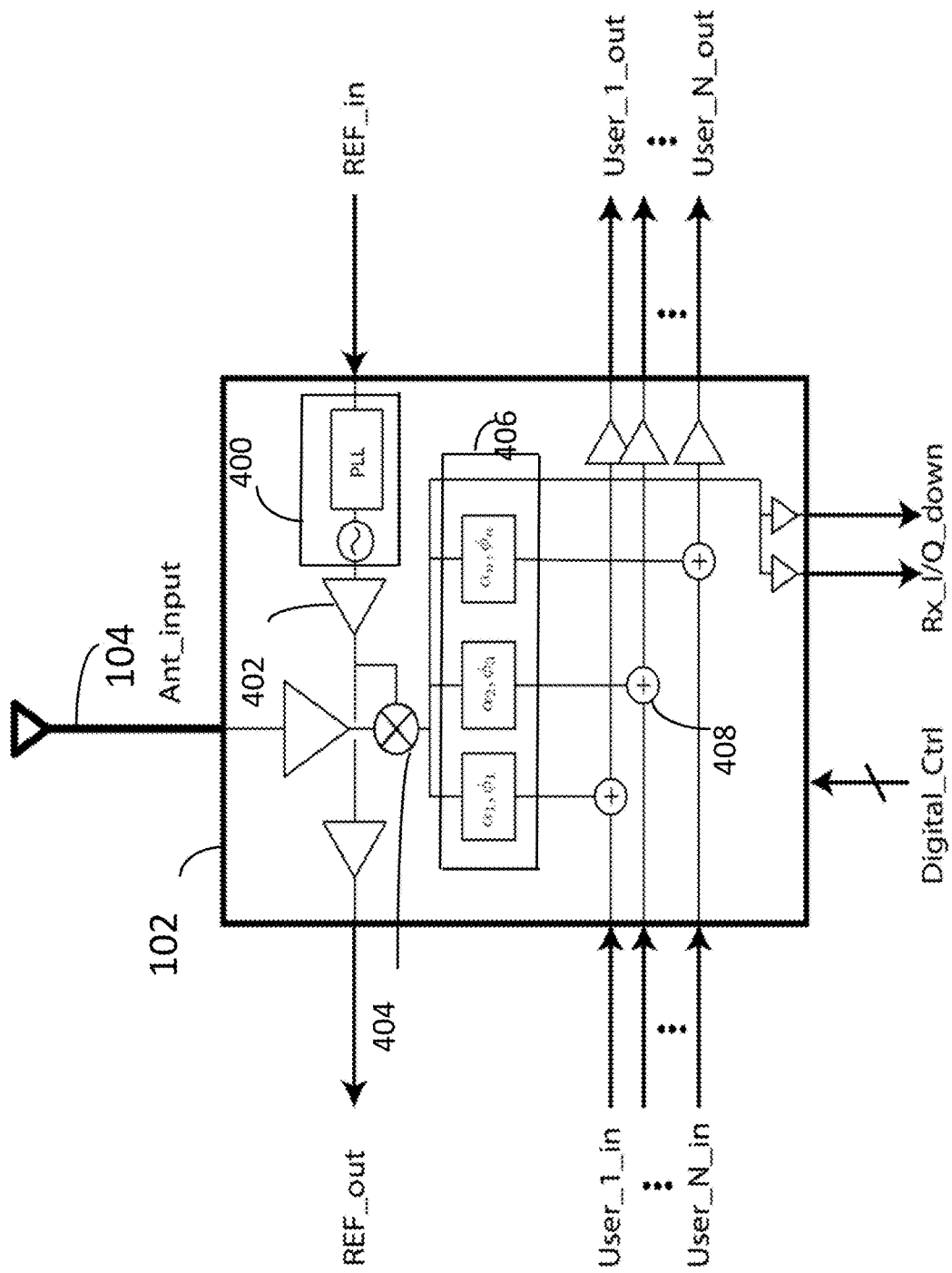
FIG. 4 illustrates a tile configured in accordance with an embodiment of the invention.

The basic structure of a receiver element is shown in FIG. 3. In particular, FIG. 3 shows a tile 102 with an associated antenna 104. The tile 102 has circuitry, as shown in FIG. 4, to implement the functionality associated with the tile. The circuitry includes the signal interface 106 of FIG. 1. The signal interface processes signals from the incoming arrows and produces signals for the outgoing arrows.

Each pixel processes the signal from a single antenna, while a single tile may have more than one pixel. Similar to a normal transceiver, there is an RF input interface to the antenna through Ant_input, and an output signal Rx_I/Q_down, which is an IF or baseband I/Q signal consisting of the frequency translated and filtered versions of the antenna signal. Unlike a traditional transceiver, and key to this invention, the tile element has an array of input and output signals, $User_{k,in}$ and $User_{k,out}$, which are the distinct data streams that are progressively filtered by the array to focus in a desired solid-angle direction. The tile element is synchronized to its neighbors by using a crystal (XTAL) or RF reference frequency fed in through $REF_{in}$ and buffered out to $REF_{out}$ for the next tile element. Note the direction of the reference synchronization is opposite to the flow of the user streams, another key innovation, as will be described below.

The entire tile is configured through a fast digital interface, labeled Digital_Control, which programs the gains, phase shifts, and state of the tile at any given moment so that beams are dynamically tracked to point in directions that result in maximum SNR or minimum interference, or a combination thereof, determined by the baseband signal processor.

FIG. 4 shows internal circuitry of a tile 102. The receiver tile 102 has frequency conversion circuitry 400 (e.g., a local phase-locked loop or frequency multiplier) that takes an incoming reference signal (REF_in) and generates a local oscillator (LO) carrier signal used for up and down-conversion. This reference signal is then passed to the next tile element through one or more local buffers 402 driving the REF_out pin. A mixer 404 is followed by a matrix of phase shifters and variable gain elements 406, which allows local beamforming on multiple streams and/or multiple angles of incidence. The matrix of phase shifters is sized equal to the number of streams or look directions processed per tile. The gain and phase shift coefficients for each stream are independently programmed through the digital interface (Digital_Ctrl). An aspect of this invention is that the incoming streams (User_1_In through User_N_In) are analog combined (summation) at summers 408 with the down-converted and phase rotated streams, which allows the entire array to do beam forming in a distributed fashion. One or more tile inputs are summed by the tile. Summation is most conveniently performed in the current domain.

As described above and shown in FIG. 5, by combing the phase and amplitude shifted tile signals with its "left" neighbor, and passing the signal on to its "right" neighbor, the chain of tiles is performing analog beamforming on multiple streams in a distributed fashion.

This greatly alleviates the need to combine signals from dozens or hundreds of tile elements, since the signal propagates from "left" to "right" without requiring a central aggregation node. This reduces routing, increases the physically realizable tile array size, increases bandwidth, and eliminates a complicated aggregation node that would otherwise be needed if the beam forming were done in a traditional centralized fashion.

Another aspect of the tile is a variable gain buffer that is used to drive the outputs, including the signals propagating to the right or output side $User_{k,out}$, the reference signal, $REF_{out}$, and the AntI/Qput signals. This buffering allows the tile count to grow without incurring excessive losses. In fact, by making the gains programmable, a constant signal amplitude can be maintained. If desired, the tile buffers can form part of the receiver and transmitter gain chain for each stream, but this requires appropriate scaling in each tile when summation occurs.

Figure 5:
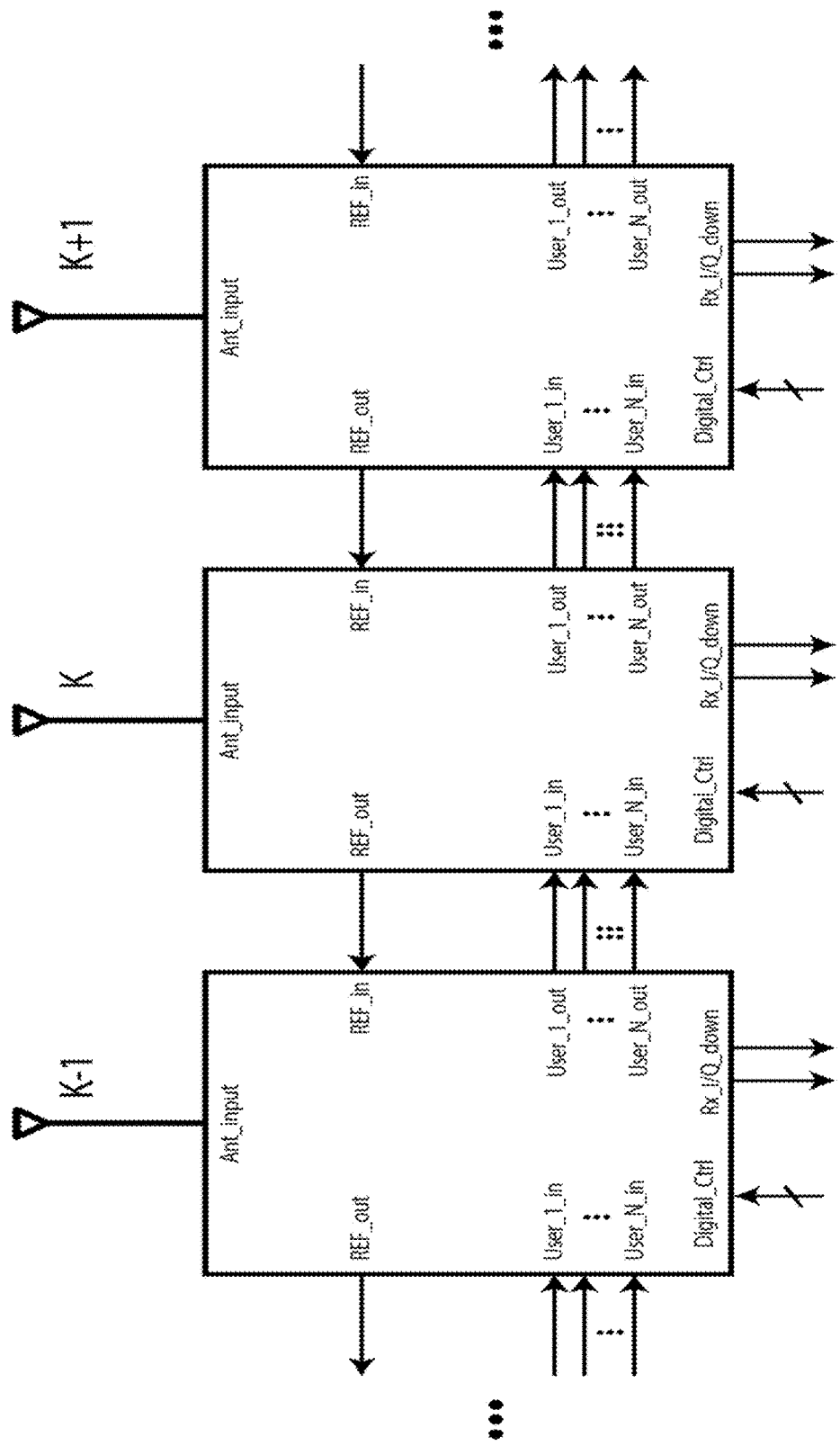
FIG. 5 illustrates a string of tiles connected with next neighbor connectivity in accordance with an embodiment of the invention.
Figure 6:
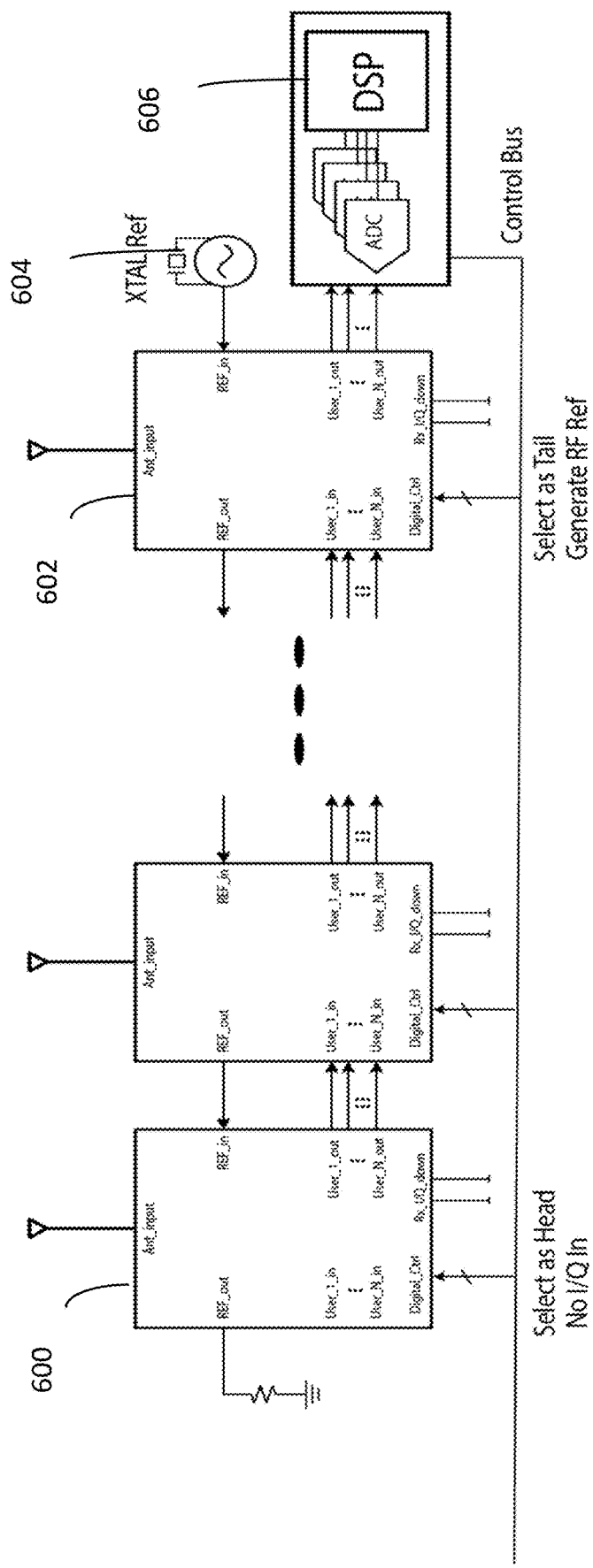
FIG. 6 illustrates a string of tiles with head and tail elements connected and interfaced differently than the rest of the tiles.

For most tile elements, the connection is as shown in FIG. 5. The head and tail nodes, though, are wired differently, as shown in FIG. 6. The head node 600 begins the beamforming process and its inputs are terminated or shorted so that no baseband or IF frequency flows in. The tail node 602 feeds its outputs to a baseband processing chip 604, where optional further down-conversion occurs, and each stream is digitized for final signal processing, for example at DSP 606. For example, the $N_s$ streams can be digitized to perform zero-forcing to minimize inter-user interference.

Figure 7:
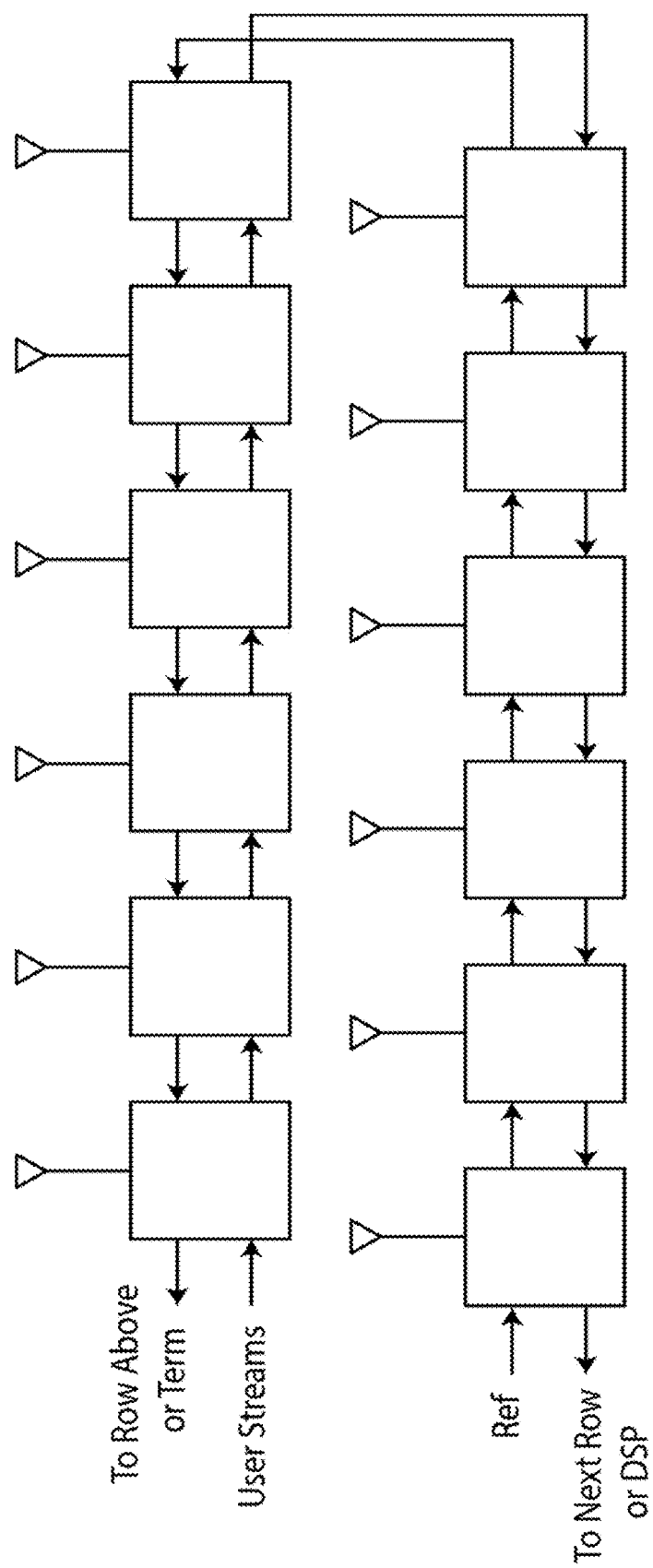
FIG. 7 illustrates a string of tiles in a zig-zag arrangement to form a 2-dimensional array in accordance with an embodiment of the invention.

Even through the tile is a linear structure, it can actually take on any shape, such as a curve through 3D space, a surface, flat two-dimensional, or even conformal, or a volume. As shown in FIG. 7, this is achieved by zig-zagging the tile over the desired curve, surface or volume, thus allowing an arbitrary shaped array to be realized. In some applications, it may be desirable to vary the interconnect spacing to place tile elements non-uniformly, and this is fully supported by the architecture.

Figure 8:
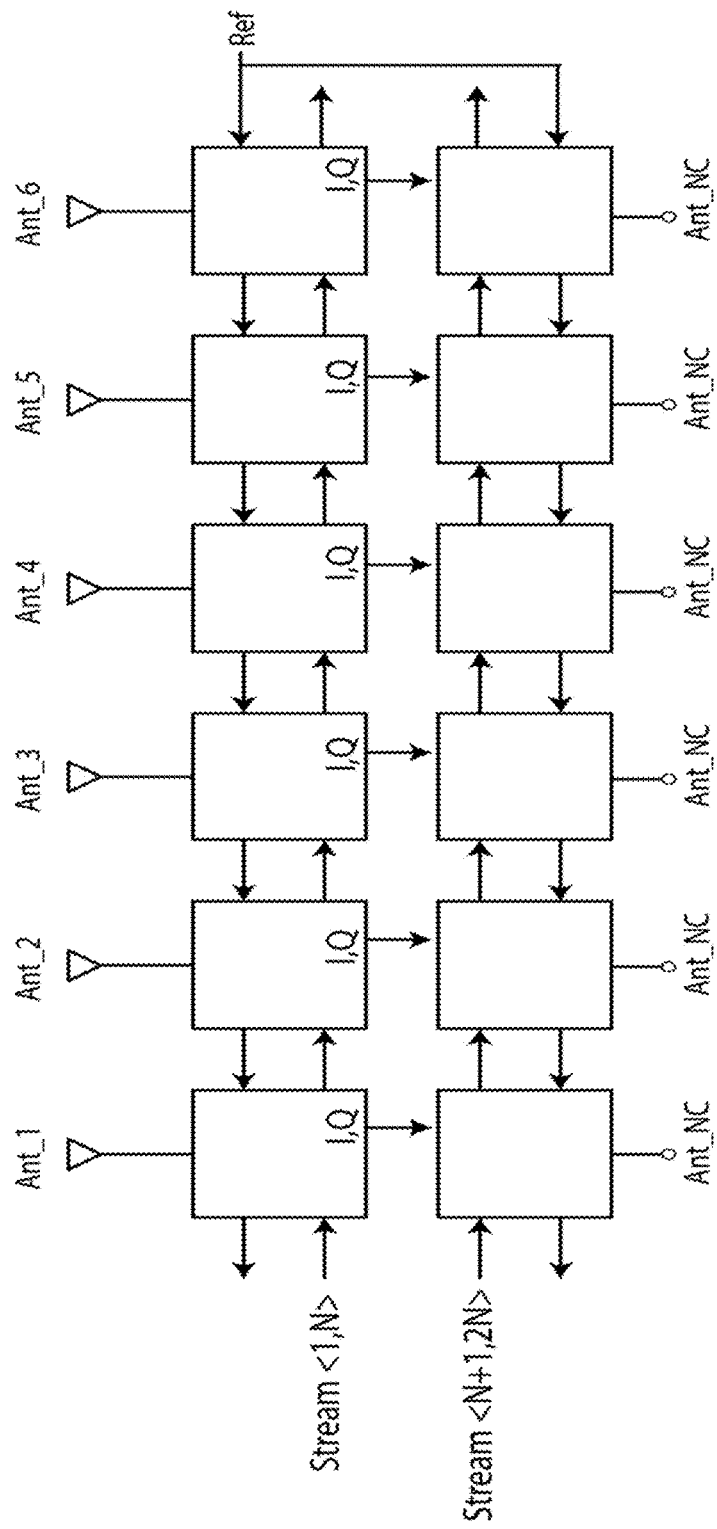
FIG. 8 illustrates a tile configuration to support an arbitrary number of data streams.

While the number of antenna elements can grow arbitrarily, the number of distinct user streams handled by the tile is fixed at $N_s$. Here we describe a way to rewire the tile to allow more user streams, as shown in FIG. 8. By connecting rows of tiles together to form a net, additional users streams are added. The additional row of tiles are configured so that the incoming antenna signal is interpreted as the IF or baseband signal rather than an incoming RF antenna signal. This can be done by reusing the antenna pin, or having dedicated pins for this functionality. Note that the row tiling process can be repeated without bound since the signals are buffered. Thus more phase rotators can operate on the incoming signal and the vector of user streams grows without any limits.

Figure 9:
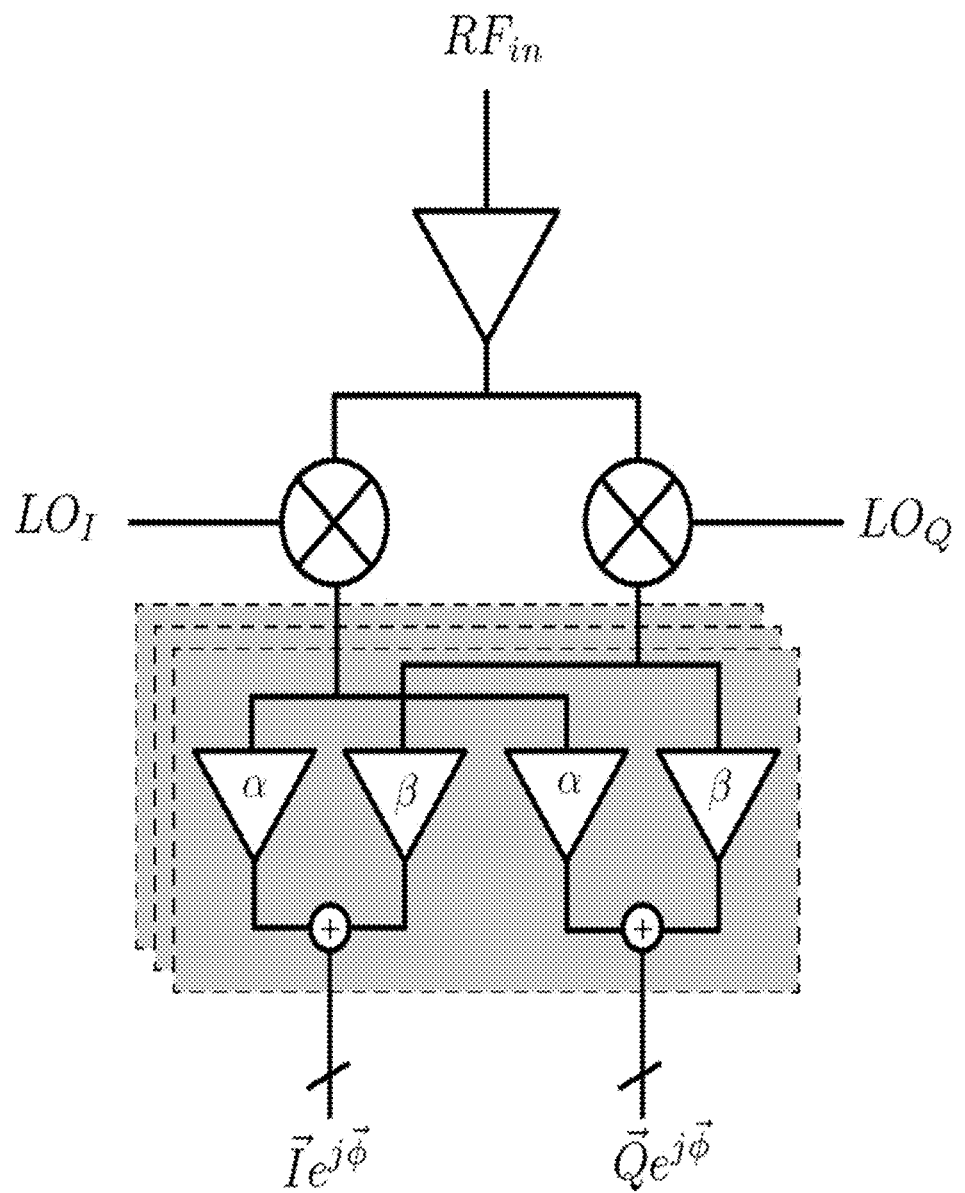
FIG. 9 illustrates a matrix of vector rotators for phase rotation of a I/Q signal.

It is desirable to make the tile compact, low cost, and high yield, since there are applications where dozens to hundreds to perhaps thousands of tile elements are used to build a very large and complex array. For mm-wave application, the tile dimensions must be smaller than the wavelength to allow the antenna to be packaged and spaced at $\lambda/2$ or $\lambda/4$ to avoid grating lobes, pushing the tile electronics to the millimeter scale. RF phase rotators are bulky as they are realized with passive elements that are often fractions of the wavelength. On the other hand, IF or baseband rotation can be done by vector combiners, or a weighted combination of in-phase (I) and quadrature-phase (Q) signals, as shown in FIG. 9. A scheme whereby down-converted I/Q signals are used inherently to do phase rotations is known in the art, but only a single stream is processed. Such an architecture is extended by allowing a large array of vector rotators (a matrix) to use the same set of I/Q signals to realize $N_s$ distinct rotations and amplitude scalings, which allows for a compact realization without any active components. Current summation, or voltage summation with transformers, is also compact as the signal of only a pair is joined per tile element. It should be noted that even if LO beam forming is used, the same principles described above apply, as weighted sums of I/Q signals from the LO chain can be combined to produce the phase rotation on the LO signal, and the IF signals are summed as before. In this fashion, a very compact tile element can be built.

Phase de-coherence can spread the beams and cause inter-stream interference. Thus, it is critical to keep the beams synchronized. The synchronization of tile elements is also performed in a distributed fashion by locking the phase/frequency of each tile's LO to its neighbor to the "right". The reference signal is buffered and sent to the next tile to continue the process. The synchronization signal can be at either a low frequency signal, whereby each tile element generates its own high frequency reference through a phase locked loop (PLL), or frequency multiplication and or an injection process, or it can be a high frequency, whereby each tile except the first locks to the reference through injection locking, frequency multiplication or PLL techniques. Using a higher frequency reference has the advantage that a wider bandwidth tracking loop can be used to keep the phase synchronized over a wide bandwidth.

The disadvantage of the distributed synchronization approach proposed is the systematic phase error that builds up as the reference signal is routed from tile to tile elements, incurring delay at each phase. This could be simply absorbed by the array as an effective offset in all beam forming coefficients, as described in connection with calibration, but this delay can be an advantage if one notes that the same delay occurs for the user streams as they propagate from tile element to element. In a system where the tile spacing is equal to a fraction of the wavelength, this delay can be significant. By simply routing the reference signal in the opposite direction, these delays cancel out, and the phase shift introduced by the reference distribution exactly matches the delays introduced by routing the user streams. Thus, the systematic error can be greatly reduced and the beam automatically is self-calibrated. The residual error to the propagation mismatch can be overcome by calibration.

This is superior to routing the same reference to all tile elements since the effective inter-connect is greatly reduced and there is no need to phase/delay match the reference signal for each tile. It should be noted that this scheme works for a uniform array of tiles, but requires compensation through calibration if the tiles are non-uniform. An optional modification of the tile is to also phase rotate the reference signal fed to the next tile element, or phase rotate the incoming reference signal, so that phase/delay mismatches can be calibrated in a per element basis.

Figure 10:
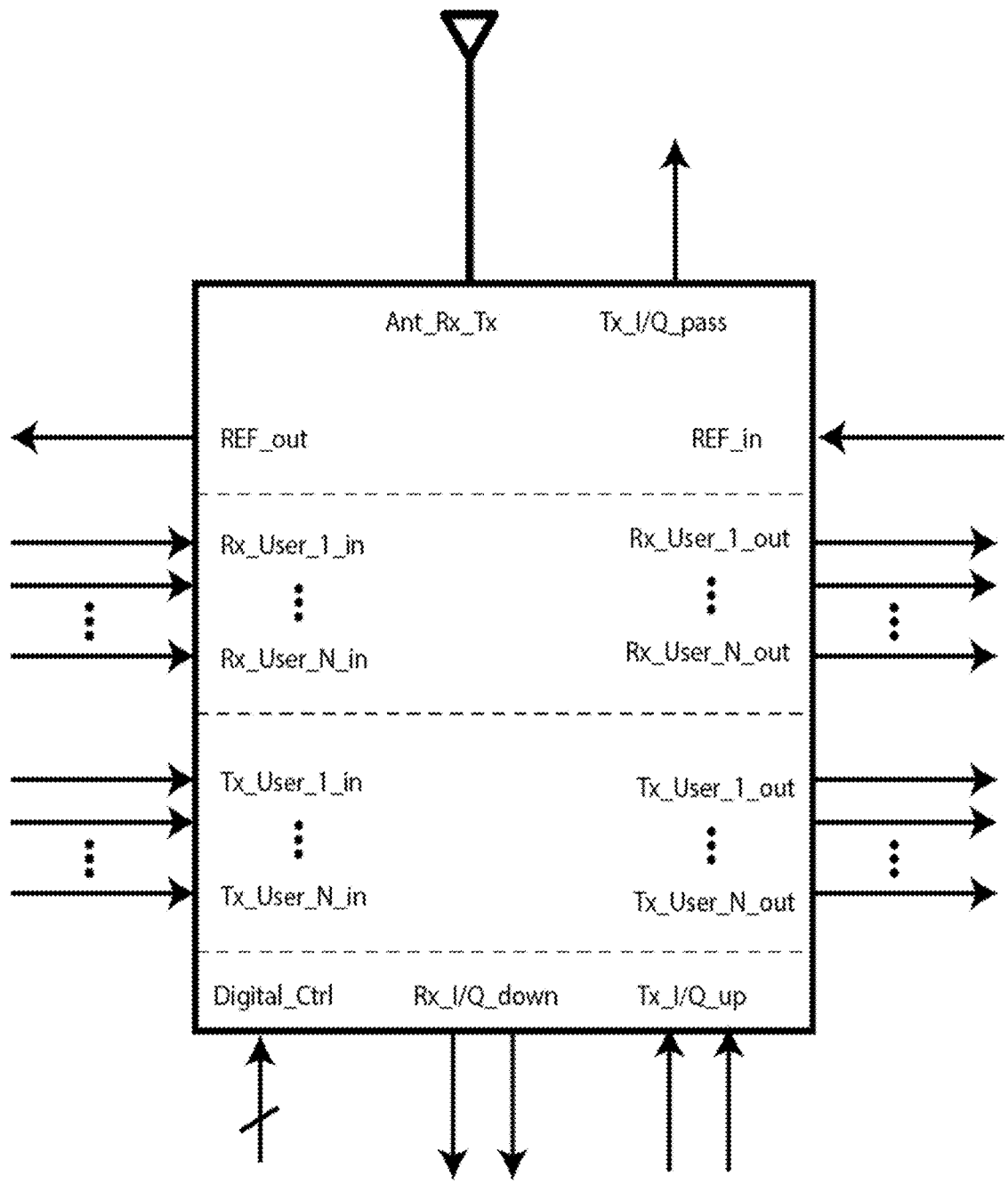
FIG. 10 illustrates a Tx/Rx tile element that combines the Rx and Tx into a single element.
Figure 11:
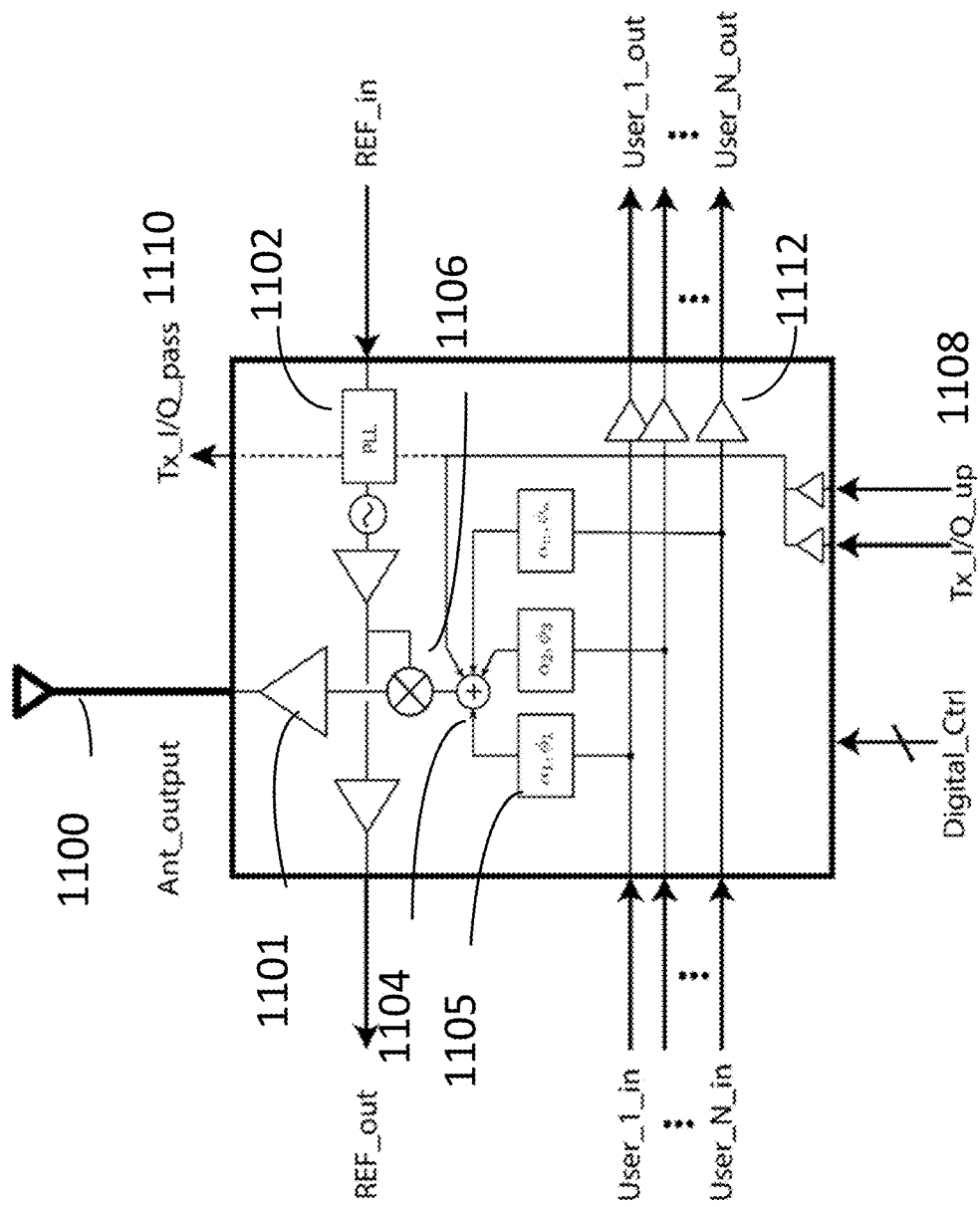
FIG. 11 illustrates a Tx tile element with internal circuitry for beamforming.

For completeness, the signal interface for a receive/transmit (Rx/Tx) combined tile is shown in FIG. 10. The transmitter architecture and tiling is very similar to the receiver. The tiling is done in exactly the same manner, so that information will not be repeated. The main difference is the internal architecture of the tile, which is shown in FIG. 11. The signals interface is very similar, with the exception that the transmitter drives the output antenna 1100, either shared with Rx with an internal Rx/Tx switch, diplexer, isolator, directional coupler, duplexer, or circulator, through a power amplifier 1101. Alternatively, a separate antenna for Rx and Tx can be used. The LO path 1102 can be shared with the RX or it can be realized as a separate circuit. Even if the Tx and Rx are offset in frequency, it is advantageous to use the same reference path.

The main difference lies in the way the beam forming is done. All user streams are beam formed inside the tile for a particular antenna, and the signal transmitted is a composite signal consisting of $N_s$ streams summed. The summer 1104 must be able to sum $N_s$ signals, which correspond to the various user streams or look angles. Each input stream is applied to a phase shifter 1105 and is combined in the summer 1104 to form a composite signal, which is fed to the mixer 1106 for up-conversion. This is done on-chip using current summing at baseband or IF rather than at RF, since current summing or voltage transformer combining can be done with lower loss and in a smaller footprint.

If more than $N_s$ streams are to be transmitted on an antenna, then it can be injected through the inputs Tx I/Q_up 1108, which can be fed from a tile element configured to do only beam forming. If the tile is configured for beam forming only, the mixer/PA are disabled and the Ant output terminal is used to drive the IF or baseband signal. Alternatively, a separate pin can be used, called Tx I/Q pass 1110 in the diagram. Since the same set of user streams need to be sent to every tile, a distributed distribution scheme is proposed wherein each tile forwards the signals to one or more neighboring tiles through a set of buffers 1108.

Figure 12:
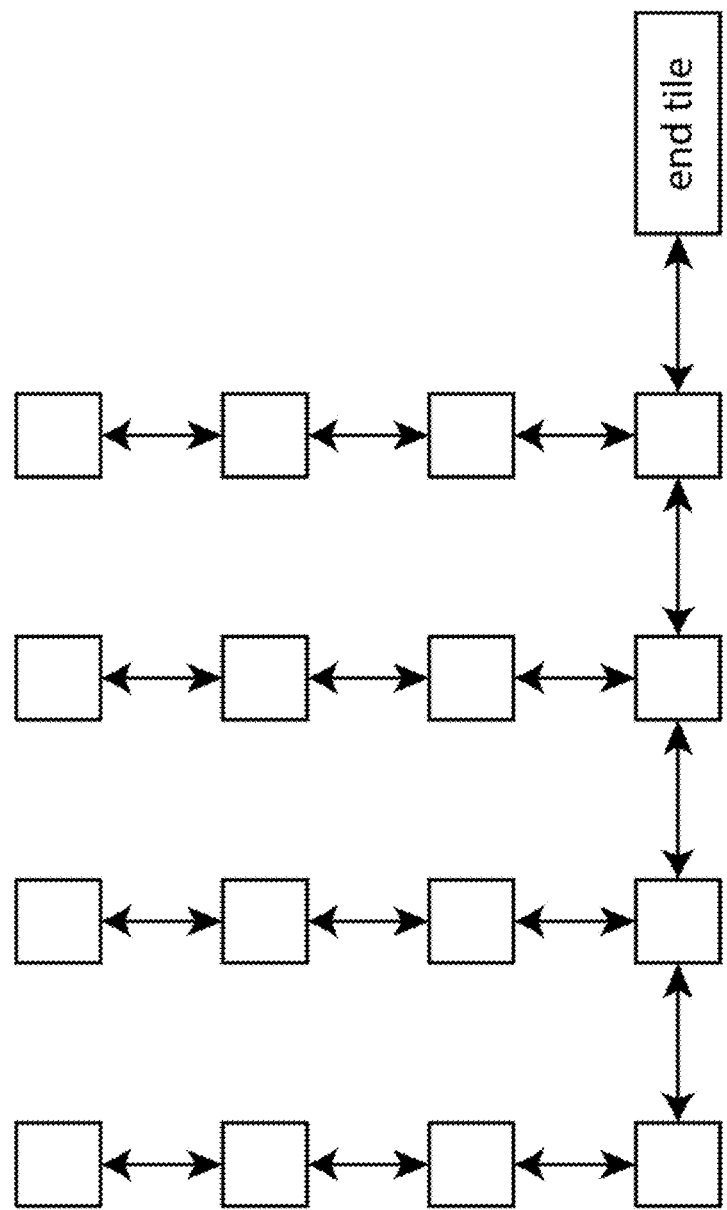
FIG. 12 illustrates an array of tiles used to reduce interconnect routing parasitics by summing columns and rows, thereby minimizing the maximum length of the tile routing from N times N to 2 N.
Figure 13:
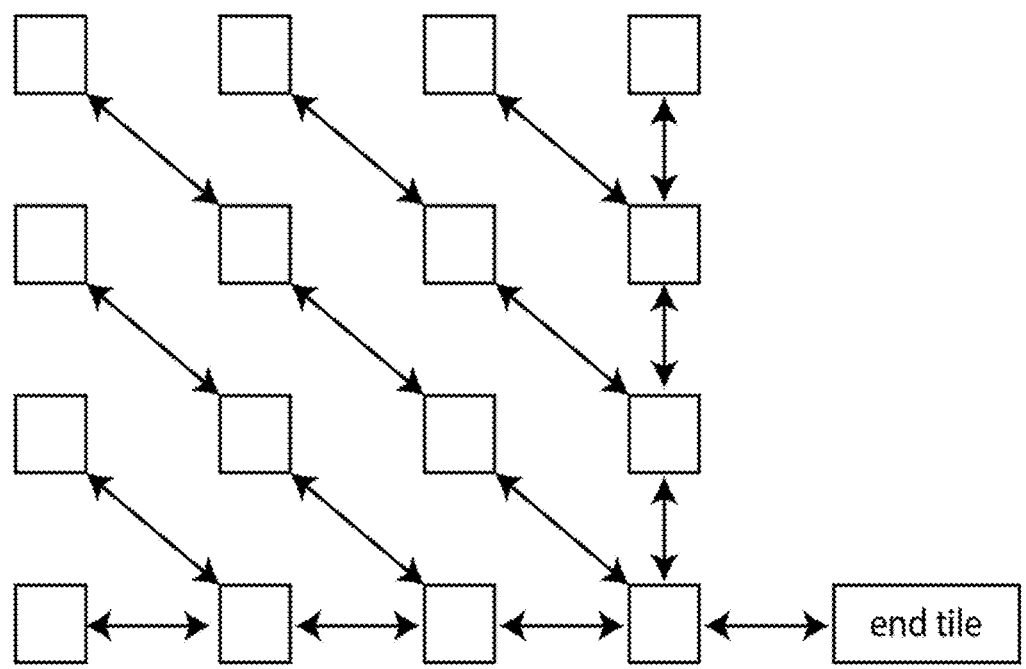
FIG. 13 illustrates a tile pattern to reduce routing length.

Tile signals can be summed in a non-linear fashion by taking advantage of the fact that the basic tile can sum multiple inputs without modification if current mode signal processing is used. If voltage mode signal processing is used, the same argument holds as long as the tile is outfitted with enough pins to do multi-input summation. In most case, a simple two-input summer will suffice. As shown in FIG. 12, signals can be summed in a row-column way so that the longest distance between any tile in an array of N by N tiles and the end-tile is two times N. In addition to row-column summation, signals can also be summed in a diagonal fashion to reduce the length further to N plus one, as shown in FIG. 13.

Figure 14:
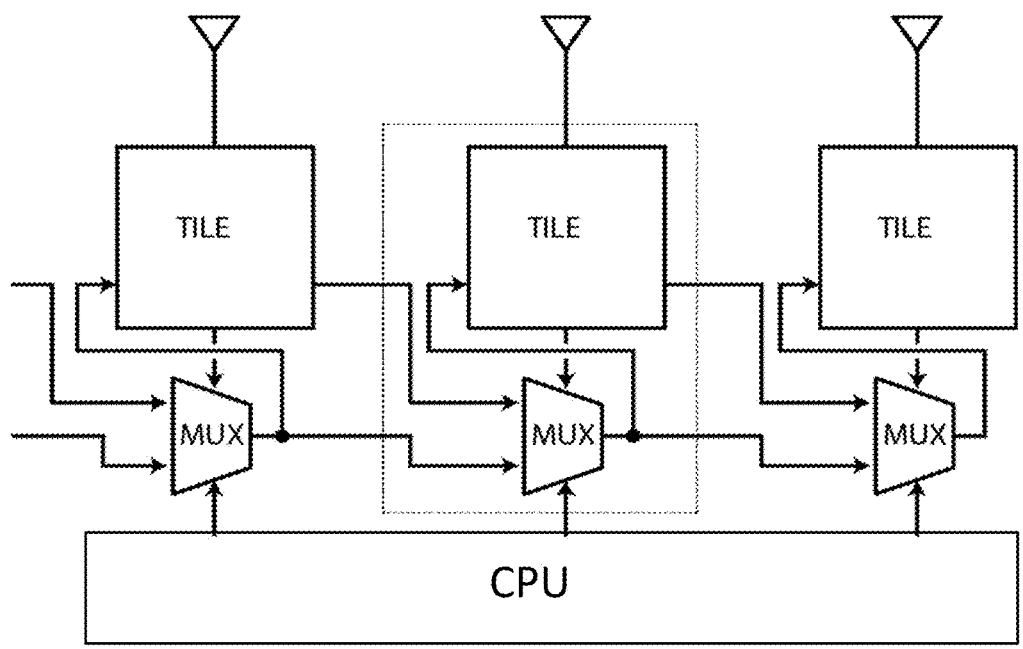
FIG. 14 illustrates a tile element co-packaged with a multiplexer to route faulty signals.

FIG. 14 illustrates that a tile can be co-packaged with a multiplexer (MUX). The MUX is used to route the Rx and Tx baseband or IF signals around the tile in case of a fault. The MUX can be activated by a neighbor that detects fault Rx or Tx data, or by the tile itself in case there is a fault detected in the RF interface or RF circuitry of the tile.

The tile can be realized in various ways. For example, multiple pixel elements can be put into a single integrated circuit to form a chip-scale tile. Antennas can be placed on the chip itself or externally. Multiple chips can then be packaged or directly bonded onto a PCB where the inter-tile interface signals allow for the realization of a very large tile. In certain applications it may be advantageous to build a wafer scale tile, or an integrated circuit wafer made up of identical tile elements. Inter-reticle communication signals can be realized in upper metal layers or through post processing to build an array. In this scenario, power/ground signals would be added to the list of inter-tile signals so that power can be delivered from one or more points to the wafer and these signals would propagate through the array. For a wafer scale array, the antenna elements may be on the wafer itself, or a second wafer could be bonded containing antennas (and possibly inter-reticle signals). In this case, the second wafer may be fabricated in a coarse pitch process technology with preferably a high resistivity or insulating substrate.

In many cases, tiles are built from a single integrated circuit and packaged and bonded to a printed circuit board. If the antenna elements are also printed or bonded onto the same PCB, then inter-antenna spacing rules determine the optimal number of tiles per board. An array of boards can be further connected through RF cables to realize the full array. Otherwise tile-to-tile communication and power signals are printed on the same PCB until the PCB is too large or unwieldy. In some applications, it may be advantages to flip-chip bond the tile integrated circuit element directly onto the PCB without an explicit package. For higher frequency applications, to minimize the size of the tile PCB, one can realize a tile module, a small PCB tile realized on a low loss material such as Rogers, or a module made from low temperature co-fired ceramic (LTCC), high temperature co-fired ceramic (HTCC), Liquid Crystalline Polymer (LCP), or other organic substrate materials, and these modules can then be further bonded onto a larger PCB to realize the array.

In summary, this invention encompasses the construction of a tile and a tile array in the following various ways:

1. A chip scale tile, or a single integrated circuit with many pixel elements using either an on-chip or external antenna connection.

2. A wafer scale tile array, or many tile elements built onto a single wafer with the wafer itself acting as the substrate for inter-tile communication and power delivery. In this embodiment, the antenna elements would be part of the tile.

3. A wafer scale tile array bonded to a second wafer that provides inter-tile communication and power delivery, and a connection for antenna elements. The second substrate could be realized with a different process technology possibly using a high resistivity or insulating substrate.

4. A package scale tile would package one or more tile dies to form a mini-array, and the packaged parts could then be further tiled to form a larger array. Antenna elements could appear inside of the package or connect externally.

5. A package plus PCB tiled array would be formed by placing the packages onto a PCB for interconnection. The antennas could be printed in the package or on the PCB.

6. A module tile could be realized in LTCC, HTCC, LCP, or an organic substrate containing the die, passive elements, and other components needed to build the tile. The module can contain one or more tile elements and could optionally integrate the antenna array.

7. An array of tiles can be interconnected using RF and direct current (DC) cables, forming a chain with all tile electronics integrated on the PCB with an optional printed or integrated antenna or a separate cable connected to an externally connected antenna.

8. Tile elements can also be connected using connectors rather than cables, especially if the carrier frequency and bandwidth requirements do not demand higher performance cables.

Tile and Array Calibration and Testing

While the testing of RF and analog integrated circuits is a well-known art, to date very few systems have been realized containing dozens, hundreds, or even thousands of integrated circuit devices in the same system. It is therefore absolutely essential to consider how such a system will cope with issues such as testing of the entire system, faulty tiles, and calibration of the entire tile array.

Tile Testing

After the fabrication of a tile element, it can be tested as a module using well known techniques. Unique features of this invention are the essential tests required to ensure that the tile element can be placed into a daisy chained array without degrading or potentially destroying the functionality of the entire tile. As such, the tile must be tested to ensure that its bypass mode, described below, is fully functional. DC or alternating current (AC) testing can be used to make sure this bypass mode is operating correction. There are three bypass modes to test, (1) Rx bypass, (2) Tx bypass, and (3) LO Reference bypass. In each mode, the tile element will pass the input stream to the output stream without any signal processing and essentially perform no other functionality. If a tile is detected to be faulty, as described below, it must be able to route the Tx/Rx and LO signals to the next tile. Tiles that cannot perform this function should not be used in the construction of a large array and can be discarded or repaired.

An optional test is to turn on a tile and to not provide any RF Rx signals. In this case, the tile should detect a faulty RF connection or circuit and attempt to route the Rx data streams around itself. This test can be performed in a DC fashion since we would only emulate the conditions. Likewise, if the RF power detectors do not detect sufficient output power, the Tx data stream should be routed around the tile and the tile should put itself into Tx bypass mode. Note that it is possible for a tile element to be operating only in Rx or Tx mode if faults in only one direction are detected. Since the RF power detectors require RF signals, the PLL should be activated and a test pattern can be fed into the IF. A load should be placed at the antenna to absorb the power. If a fault in the LO reference is detected, then both Rx and Tx are bypassed since an inoperable LO signal means the RF parts of the circuit cannot function.

Array Testing: Fault Detection

It is well known that a large fraction of the cost to realize a system is in the testing and calibration of the integrated circuit elements and in the inevitable yield losses. Since our proposed system is made from an array of identical elements, with dozens, hundreds, or even thousands of elements, it is very important to realize a system that can yield very high volumes with low cost of testing. For very low cost applications, it may be favorable to avoid RF testing at the die level or even package level and let the array automatically route around under-performing or inoperable tile elements. This is a unique feature of our invention that each tile element is daisy chained to its neighbors and is in the critical path. If a single tile element were to fail, the entire array would cease to function, due to the distributed nature of the signal processing.

To avoid this scenario, each tile can be programmed to be shut off or to go into bypass mode. In shut-off mode, the tile would go into a minimal loading state and allow external circuitry to route around the tile. Alternatively, in bypass mode, the tile element would simply route its incoming signals to its outgoing signals in such a manner as to provide minimum insertion loss or distortion. Since this functionality can be tested with DC or minimal RF testing, we can guarantee that tile elements can perform this function. In this way, once a tile failure is detected, the offending tile element will be put into bypass mode and the operation of the entire array will only be affected in a minimal way (due to the large number of tiles). Detection of faulty tiles can occur in a centralized manner by periodically shutting down tile elements one by one and examining the noise floor, output power, and SNR of each tile element, and then shutting down tiles that are not performing to specifications. The bypass mode can be enabled by default in active high configuration, so that if a chip/tile is powered up, it will be in bypass mode unless programmed otherwise by the digital interface. In this way, even if a tile element has a non-functional digital interface, it will not impair the functionality of the entire tile array.

Alternatively, tiles themselves can detect faulty neighbors by detecting a condition when the input signal to the tile from its neighbor is smaller than a given threshold. In this scenario, the tile would activate its neighbor with a bypass signal so that traffic is routed around the offending neighbor automatically. If the tile does not respond, due to a faulty interface, then this information will be raised to the central processor for further action. An alarm can be set off or the central processor may have other means of routing around the tile element.

In another embodiment of the invention, this is achieved by placing a multiplexer (MUX) around each tile, where the incoming data is either from a propagating tile element or from a next to previous tile element, in case a fault is detected (see FIG. 14). When a faulty tile is detected centrally through testing signals or in a distributed fashion, as described above, then the tiles or the central processing unit (CPU) can activate the MUX to route traffic around the faulty node.

It is important to note that the MUX is only handling analog baseband or alternatively an IF signal, and so the electronics to realize the MUX are not expensive. All RF signal interfaces occur between the tile and the antenna. If the tile detects faulty or under-performing RF performance, it can itself activate the MUX to route traffic around itself, in the same manner as described above.

Tile Calibration

Tile calibration is important because a large array of elements will have gain and phase offsets and errors that will make it more difficult to form coherent beams. As previously mentioned, our tiles will be phase and frequency locked using the described LO reference signal distributed scheme. On the other hand, each tile element will have phase and gain errors in the phase shifter that will make it difficult to properly align the beam. Note that each tile element has $N_s$ phase shifters corresponding to the number of parallel streams (beams) processed, which in many cases is the number of independent users.

To circumvent this problem, both before and/or after construction of the tile, we will describe techniques to calibrate the tile elements. In some applications, tile calibration may be done prior to array construction as modules may be assembled by the end-user in unknown configurations. In other cases, to save cost, tile calibration may be skipped and only array calibration is performed. This will depend largely on the application scenario.

A key invention is that in order to do array and tile calibration, we use a complementary array of pre-calibrated elements that can transmit power with a well-known phase and receive power with a well-known phase shift. The tile elements (or array as a whole) to be calibrated are placed into this testbed, referred to as a test jig, using close-contact near field coupling or placed in the far field of the test jig. For far field coupling, waveguides can be used to feed signals into a single tile element. For near field coupling, the tile element phase errors will be calibrated but the antenna mismatches will not be calibrated. Far-field testing allows both but requires a more expensive setup.

If individual tile elements are tested, they can be temporarily connected to a back-end PCB with sockets. If the entire array is to be tested, then the actual array as a whole will be used. The key innovation is that the complementary jig array is conformal with the array to be tested, and energy can be injected into individual tile elements with small or negligible coupling to neighboring elements. The jig array may contain capacitive coupling elements, inductive coupling feeds, or a horn array to inject power into a known tile.

This calibration testbed will then artificially excite (or detect) a signal with incoming/outgoing radiation at a known direction (solid angle). The baseband processor can then program each tile element to maximize the received/transmitted power and cancellation of this incoming beam by programming each tile element with its correct phase of each element. This should be done for every channel, or stream, so that all parallel beam formers are programmed together.

Note that we do not try to maximize the beam-formed SNR alone, but rather we maximize both beam forming and beam nulling capability, because nulling errors are much more sensitive to the errors in phase. Forming accurate beams does not require high precision in the beam forming phase, whereas beam nulling is very difficult to achieve without high accuracy, so coarse tuning is performed with beam forming and precise phase tuning is done with beam nulling.

The baseband processor measures the signal power after beam nulling and runs an optimization algorithm (such as least-mean squares commonly known as LMS) to perturb the phase coefficients in order to maximize/minimize the received power in beam forming/nulling mode. In this way, errors in the tile phase settings are discovered for each setting. As the beam is steered across the solid angle and each tile element is then switched into a new phase setting, the algorithm is re-run and a table is stored for the phase error at each phase setting. It is important to map through a large space of beams/nulls to exercise all the phase coefficient of the array, while it is important that the points in space are chosen judiciously not to repeat the same phase code too many times for individual tile elements.

This information can be stored into the tile or baseband processor memory and used subsequently when the tile operates. If stored in the baseband memory, pre-distorted phase values are fed to the tile. The optimization process ensures that SNR beam forming and beam nulling capability is enhanced from the pre-calibrated state, which may require a loop to run beam nulling and beam forming optimization serially until the desired resolution is met.

Note this same procedure can be done in the reverse direction to calibrate the transmitter phase coefficients. In this case, the test jig is put into receive mode and the phased array coefficients of the test jig are tuned to given direction locations in space. The transmit array is then optimized in a similar fashion, alternatively with nulls and peaks pointing at the jig. Each transmit channel should be optimized either simultaneously, if the jig has multi-channel capability, or serially if the jig can only look in a given direction.

Gain errors can use a similar procedure. To make the process systematic, we can start with two array elements and tune their gains until their powers cancel out at the test jig (in transmit mode) or in the baseband (in receive mode). After phase calibration is performed, we can set the phase of one element to be the opposite of the other and then adjust the gain coefficient until cancellation is observed. Note that we can also zero the phase on all elements and use the test jig to provide known phase shifts, but note that "zero" phase implies that the zero point is calibrated, which should be done in the first step described above. Once two elements are calibrated, more elements can be added, each time adding two adjacent elements, and in this manner the entire array gain coefficients are matched in pairs. The procedure is then repeated between two pairs of elements, and then four pairs, and so on. In this way, elements are first matched to each other, then pairs are matched, until all elements of the array are normalized in gain.

To further calibrate for gain errors, we can also look at grating lobes, which can be reduced by tapering the power in the array. The side-lobe levels can be measured as a function of the tapering and each gain element is adjusted until the desired side-lobe level is reached. For example, we start with a desired uniform array and then shift the coefficients into a given taper (such as linear), which reduces the side-lobe levels by a given amount. The difference between the side lobes from linear to uniform is a well-known quantity, and errors can be attributed to array non-uniformity, which is corrected through an LMS optimization loop. This can be done for both the transmit direction and the receive direction.

If desired, a two-dimensional calibration can be performed if there is interaction between the gain and phase settings, sometimes referred to as amplitude modulation to phase modulation (AM-PM) errors. In this manner the phase shifts are tuned for each gain setting, forming a large two-dimensional table. By combining the above phase and gain calibration procedure, this two dimensional table can be discovered and stored.

It is important to note that the described gain and phase matching technique compensates not only for the tile elements, but also it can compensate for routing losses in a large array. Both the transmit and receive signal travel a different distance from tile elements to the destination, and systematic gain errors in the array are corrected by storing offset codes in the tile elements. This substantially reduces the cost of building a high accuracy system with hundreds or even thousands of elements.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising: an array of antennae including a first antenna with a first tile circuit, each antenna in the array having a tile circuit including: a frequency conversion circuit to generate, from an incoming reference signal, a local oscillator carrier signal operative as an outgoing reference signal for an adjacent tile circuit associated with an adjacent antenna to the first antenna, a mixer to receive the local oscillator carrier signal and combine it with an antenna signal to produce a frequency converted antenna signal, a matrix of phase shifters and variable gain elements to produce a set of frequency converted and phase rotated antenna signals, and analog summers to combine the frequency converted and phase rotated antenna signals with user input signals from the adjacent tile circuit for distributed and simultaneous analog multi-beam forming of a vector of analog baseband data streams or a vector of intermediate frequency data streams, wherein the user input signals correspond to distinct users tracked by the array of antennae, the first tile circuit and adjacent tile circuit forming a chain of tiles performing analog beam forming on multiple streams in a distributed fashion.

2. The apparatus of claim 1 wherein the number of antennae in the array is substantially greater than the number of user input signals.

3. The apparatus of claim 1 wherein the matrix of phase shifters and variable gain elements are configured in response to a digital control signal.

4. The apparatus of claim 1 wherein the frequency converted antenna signal is directed toward another adjacent tile circuit.

5. The apparatus of claim 1 wherein the array of antennae are configured in a row with a head tile circuit, intermediate tile circuits and a tail tile circuit in daisy chain communication.

6. The apparatus of claim 5 further comprising a digital signal processor connected to the array of antennae in the row.

7. The apparatus of claim 1 wherein the array of antennae includes a two-dimensional configuration of tile circuits with a radio frequency signal propagating a first direction for odd rows and a second direction for even rows, where the first direction and the second direction are opposite directions.

8. The apparatus of claim 1 wherein the array of antennae includes a two-dimensional configuration of tile circuits with a radio frequency signal propagating along columns and then rows, where the head of each column combines signals from two nearest neighbor tile circuits.

9. The apparatus of claim 1 wherein the array of antennae includes a two-dimensional configuration of tile circuits with a radio frequency signal propagating along diagonals, where the head of each diagonal combines signals from two nearest neighbor tile circuits.

10. The apparatus of claim 1 wherein each tile circuit includes: a second matrix of phase shifters and variable gain elements to process the user input signals from the adjacent tile circuit to produce a set of frequency converted and phase rotated user signals, a summer to combine the set of frequency converted and phase rotated user signals to form a composite signal, a second mixer to produce an up-converted composite signal, and a power amplifier to apply the up-converted composite signal to an antenna.

11. The apparatus of claim 1 wherein each tile circuit further comprises bypass circuitry.

12. The apparatus of claim 11 wherein the bypass circuitry facilitates bypass of a receive signal, a transmit signal and the local oscillator carrier signal.

13. The apparatus of claim 11 wherein the bypass circuitry is activated by default on power up, such that a non-functional tile bypasses signals by default.

14. The apparatus of claim 1 wherein the tile circuit compares an input signal from the adjacent tile circuit to a threshold and produces a signal to bypass the adjacent circuit when the input signal is beneath the threshold.

15. The apparatus of claim 1 in combination with a test jig that injects signals through near-field or far-field into each antenna of the array of antennae.

16. The apparatus of claim 15 wherein known precise phase shift signals are applied to radiating elements of the test jig and the array of antennae phase and amplitude coefficients are modulated to alternately beam form and beam null to correct errors.

17. The apparatus of claim 15 wherein known precise phase shift signals are transmitted from the array of antennae to the test jig and the phase and amplitude coefficients are modulated to alternately beam form and beam null to correct errors.

18. The apparatus of claim 15 wherein amplitude calibration modulation signals are applied to radiating elements of the array of antennae and are detected by the test jig in a manner to cancel signals from adjacent tile circuits.

19. The apparatus of claim 15 wherein the test jig radiates uniform power and amplitude calibration modulation signals to the array of antennae to cancel signals from pairs of adjacent tile circuits.

20. The apparatus of claim 15 wherein known precise phase shift signals are applied to radiating elements of the test jig and the array of antennae phase and amplitude coefficients are modulated to maximize side-lobe suppression.

21. The apparatus of claim 15 wherein known precise phase shift signals are transmitted from the array of antennae to the test jig and the test jig phase and amplitude coefficients are modulated to maximize side-lobe suppression.

\* \* \* \* \*